United States Patent
Decraene et al.

(10) Patent No.: US 11,929,910 B2
(45) Date of Patent: Mar. 12, 2024

(54) COMMUNICATION METHOD IMPLEMENTED BY A FIRST ROUTER OF AN AUTONOMOUS SYSTEM USING AN INTERIOR GATEWAY PROTOCOL

(71) Applicant: ORANGE, Issy-les-Moulineaux (FR)

(72) Inventors: Bruno Decraene, Chatillon (FR); Isabelle Athias, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/973,638

(22) PCT Filed: Jun. 13, 2019

(86) PCT No.: PCT/FR2019/051429
§ 371 (c)(1),
(2) Date: Dec. 9, 2020

(87) PCT Pub. No.: WO2020/002792
PCT Pub. Date: Jan. 2, 2020

(65) Prior Publication Data
US 2021/0250274 A1  Aug. 12, 2021

(30) Foreign Application Priority Data
Jun. 28, 2018 (FR) ...................................... 1855911

(51) Int. Cl.
*H04L 45/02* (2022.01)
*H04L 47/2466* (2022.01)

(52) U.S. Cl.
CPC ........ *H04L 45/025* (2013.01); *H04L 47/2466* (2013.01)

(58) Field of Classification Search
CPC . H04L 45/025; H04L 47/2466; H04L 45/125; H04L 45/121; H04L 47/2416; H04L 47/22; H04L 47/10
See application file for complete search history.

(56) References Cited

U.S. PATENT DOCUMENTS 7,860,024 B1 * 12/2010 Greenberg .............. H04L 41/12
370/254
8,897,140 B1 * 11/2014 Bhattacharya ........ H04L 47/122
370/237
(Continued)

FOREIGN PATENT DOCUMENTS

CN      101325542 A     12/2008
CN      101432720 A      5/2009
(Continued)

OTHER PUBLICATIONS

English translation of the Written Opinion of the International Searching Authority dated Dec. 29, 2020 for corresponding International Application No. PCT/FR2019/051429, filed Jun. 13, 2019.

(Continued)

*Primary Examiner* — Omer S Mian
(74) *Attorney, Agent, or Firm* — David D. Brush; Westman, Champlin & Koehler, P.A.

(57) ABSTRACT

A communication method implemented by a first router of an autonomous system using an interior gateway protocol. The method includes determining at least one flow control parameter for sending messages of the interior gateway protocol to the first router, the at least one flow control parameter being determined based on capacity of the first router to process the messages of the interior gateway protocol; and announcing, in a message of the interior gateway protocol, the at least one control parameter to at least a second router of the autonomous system, which is a neighbor of the first router.

12 Claims, 2 Drawing Sheets

(56) References Cited

U.S. PATENT DOCUMENTS

| | | | |
|---|---|---|---|
| 2006/0133298 | A1 | 6/2006 | Ng et al. |
| 2013/0286846 | A1* | 10/2013 | Atlas ............... H04L 47/726 370/235 |
| 2015/0244628 | A1 | 8/2015 | Gredler et al. |
| 2017/0195214 | A1 | 7/2017 | Wu |
| 2021/0194612 | A1* | 6/2021 | Johnson ............ H04J 3/0661 |
| 2022/0158946 | A1* | 5/2022 | Li ..................... H04L 45/74 |

FOREIGN PATENT DOCUMENTS

| | | | |
|---|---|---|---|
| CN | 103825822 A | 5/2014 | |
| CN | 104521194 A | 4/2015 | |
| CN | 106603417 A | 4/2017 | |
| CN | 106961391 A | 7/2017 | |
| CN | 107872383 A | 4/2018 | |
| CN | 108206780 A | 6/2018 | |
| WO | WO-2014079006 A1 * | 5/2014 | ........... H04L 47/10 |

OTHER PUBLICATIONS

Lindem et al., "Extensions to OSPF for Advertising Optional Router Capabilities", Request for Comments: 7770, ISSN: 2070-1721, dated Feb. 2016.

Ginsberg et al., "IS-IS Extensions for Advertising Router Information", Request for Comments: 7981, ISSN: 2070-1721, dated Oct. 2016.

International Search Report dated Aug. 28, 2019 for corresponding International Application No. PCT/FR2019/051429, filed Jun. 13, 2019.

Written Opinion of the International Searching Authority dated Aug. 28, 2019 for corresponding International Application No. PCT/FR2019/051429, filed Jun. 13, 2019.

French Search Report and Written Opinion dated Jan. 30, 2019 for corresponding French Application No. 1855911, filed Jun. 28, 2018.

Lacharite et al., "Hierarchical OLSR; draft-lacharite-manet-holsr-01.txt" Hierarchical OLSR; draft-lacharite-manet-holsr-01.txt, Internet Engineering Task Force, IETF; Standardworkingdraft, Internet Society (ISOC) 4, Rue Des Falaises CH-1205 Geneva, Switzerland, No. 1, Nov. 18, 2008 (Nov. 18, 2008), XP015059386.

Decraene et al., "Shortest Path First (SPF) Back-Off Delay Algorithm for Link0State IGPs; rfc8405.txt" Shortest Path First (SPF) Back-Off Delay Algorithm for Link-State IGPS; rfc8405.txt, Internet Engineering Task Force, IETF; Standard, Internet Society (ISOC) 4, Rue Des Faleises CH-1205 Geneva, Switzerland, Jun. 26, 2018 (Jun. 26, 2018), pp. 1-14, XP015126347.

First Chinese Office Action dated Jan. 5, 2022, for corresponding Chinese Application No. 201980041910.5.

Q. Liang et al., "OSPF Extensions for Flow Specification draft-ietf-ospf-flowspec-extensions-01" IEFT Internet Draft, dated Apr. 14, 2016.

Jun Pan, "Research on the Routing Technology of IP Satellite Communication System" dated Jan. 1, 2010 (English Abstract only).

* cited by examiner

COMMUNICATION METHOD IMPLEMENTED BY A FIRST ROUTER OF AN AUTONOMOUS SYSTEM USING AN INTERIOR GATEWAY PROTOCOL

CROSS-REFERENCE TO RELATED APPLICATIONS

This Application is a Section 371 National Stage Application of International Application No. PCT/FR2109/051429, filed Jun. 13, 2019, the content of which is incorporated herein by reference in its entirety, and published as WO 2020/002792 on Jan. 2, 2020, not in English.

FIELD OF THE DISCLOSURE

The invention relates to the general field of telecommunications.

It relates more particularly to an Interior or Internal Gateway Protocol (also known as IGP) implemented in an autonomous system in the context of packet switched networks and in particular of IP/MPLS (Internet Protocol/Multi Protocol Label Switching) networks. In a manner known per se, an autonomous system (or AS) designates a network or more generally a set comprising a plurality of routers and a plurality of links or interconnections, generally under the responsibility of the same administrative authority (called operator of the autonomous system), and within which a consistent interior gateway policy is applied. No limitation is attached to the nature of the telecommunication services transported by the considered networks.

BACKGROUND OF THE DISCLOSURE

The interior gateway protocols (i.e. which are implemented for the data packet routing within the considered autonomous system) must determine consistent routing tables throughout the autonomous system, which requires that the routers participating in this interior gateway protocol exchange messages sufficiently quickly to allow this common vision.

Particularly, the link state protocols such as for example the IS-IS (Integrated System-Integrated System), OSPF (Open Shortest Path First) protocols, etc., are low-level protocols that are based on the assumption that all the routers of the autonomous system have a common topological vision (that is to say a knowledge) of the autonomous system, in other words, of the different routers of the autonomous system as well as of the interconnections existing between these routers. To this end, each router of the autonomous system stores a topological database reflecting the topology of the autonomous system and shares it with its neighbor routers of the autonomous system. Step-by-step, this allows synchronization of the topological databases maintained by all the routers of the autonomous system. It is this topological database that allows each router to determine a route in the autonomous system for the transport of data packets it receives up to the egress router of the autonomous system.

The discovery of the topology of the autonomous system requires, for each router, the preliminary discovery of its neighbor IGP routers and of their operating state. This is achieved by the regular exchange of "hello" messages with its neighbors. Each router further constructs one or several topology description message(s), describing itself as well as its own links towards its neighbor routers. These messages are called Link State Advertisement (LSA) for the OSPF and Link State Packet (LSP) protocol for the IS-IS protocol.

The set of all these LSA/LSP messages allow the complete knowledge of the topology of the network. They form the topology database (Link State Data Base (LSDB)). Each router stores a copy of this topology database. This database is broadcast to all the routers of the interior gateway protocol by a step-by-step replication (from neighbor router to neighbor router). This step of broadcasting the LSA/LSP messages is called flooding. When a router modifies one of its own topology description messages, this router rebroadcasts it to its neighbors, which themselves will rebroadcast it to their own neighbors, and so on until all the routers of the network have this new topology description message and thus all have the same LSDB. Finally, a third type of IGP messages allows two neighbor routers to check that they have the same list of topology description messages, and therefore the same topology.

In the remainder of the description, these messages exchanged between the routers that transport information allowing the routing of the data packets in the autonomous system are designated by "messages of the interior gateway protocol" (as opposed to the data packets as such conveyed between the routers thanks to the routing information exchanged between the routers and to the interior gateway protocol implemented).

Any delay time delaying the synchronization of the topological databases maintained by the routers, in other words any delay time in the flooding mechanism implemented may result, in the event of a failure of a router of the autonomous system and/or of a change in the topology of the autonomous system, by increase in the number of lost data packets. Likewise, any temporary inconsistency between the topological databases (even by a few tens of milliseconds) may lead to routing inconsistencies, micro-loops, losses of data packets and/or interface saturation in the autonomous system.

At the same time, care must be taken not to saturate the routers of the autonomous system with the messages of the interior gateway protocol exchanged during this synchronization. To this end, the operators of the autonomous systems generally implement a very conservative approach consisting in "hard"-parameterizing at the configuration of the router or the software of the router (that is to say permanently) a predetermined delay time fixed between two messages sent by a router to a neighbor (for example 33 ms or 100 ms).

With a view to improving the performance of the interior gateway protocol and in particular of the flooding, an optimization of this delay time could be envisaged by the operators of the autonomous systems, for example on a regular basis. However, such an optimization proves to be long and complex to perform so that it is never implemented by the operators of the autonomous systems.

Although described with reference to a link state interior gateway protocol, similar problems also arise for other interior gateway protocols, such as, for example, the RIP Protocol (Routing Information Protocol) or the RIPnG Protocol (Next Generation).

SUMMARY

The invention proposes a simple solution that allows in particular improving the performance of an interior gateway protocol. It relates more particularly to a communication method implemented by a first router of an autonomous system using an interior gateway protocol, said communication method comprising:

a step of determining at least one flow control parameter for sending messages of the interior gateway protocol to the first router, said at least one flow control parameter being determined based on a capacity of the first router to process said messages of the interior gateway protocol; and a step of announcing, in a message of the interior gateway protocol, said at least one control parameter to at least a second router of the autonomous system neighbor of the first router.

The invention also relates to a method for sending messages of an interior gateway protocol implemented in an autonomous system, said method being implemented by a router of the autonomous system called second router and comprising:

a step of receiving a message of the interior gateway protocol coming from another router of the autonomous system, called first router, neighbor of the second router, said message announcing at least one flow control parameter for messages of the interior gateway protocol, said at least one flow control parameter having been determined by the first router based on a capacity of this first router to process said messages of the interior gateway protocol; and a step of determining conditions for sending at least one message of the interior gateway protocol to the first router that are adapted to said at least one flow control parameter announced by the first router; and a step of sending said at least one message of the interior gateway protocol to said first router by applying the determined sending conditions.

Correspondingly, the invention also relates to a router of an autonomous system, called first router, the autonomous system using an interior gateway protocol and the first router comprising:

a determination module, configured to determine at least one flow control parameter for messages of the interior gateway protocol sent to the first router, said at least one flow control parameter being determined based on a capacity of the first router to process said messages of the interior gateway protocol; and an announcement module, configured to announce said at least one control parameter to at least a second router of the autonomous system neighbor of the first router.

The invention also relates to a router of an autonomous system, called second router, the autonomous system using an interior gateway protocol and the second router comprising:

a receiving module, capable of receiving a message of the interior gateway protocol coming from another router of the autonomous system, called first router, neighbor of the second router, said message announcing at least one flow control parameter for sending messages of the interior gateway protocol to the first router, said at least one flow control parameter having been determined by the first router based on a capacity of this first router to process said messages of the interior gateway protocol; and a determination module, configured to determine conditions for sending at least one message of the interior gateway protocol to the first router that are adapted to said at least one flow control parameter announced by the first router; and a sending module, configured to send said at least one message of the interior gateway protocol to said first router by applying said sending conditions.

The invention therefore proposes a solution that is easy to implement to improve the performance of an interior gateway protocol in an autonomous system which consists, for a (first) router of the autonomous system, in announcing to its neighbors in the autonomous system (second routers within the meaning of the invention), one (or several) flow control parameter(s) intended to be applied by them to the flow of messages of the interior gateway protocol that they send to the first router, this/these flow control parameter(s) being determined by the first router based on its own capacities to process the messages of the interior gateway protocol. By "flow control parameter", it is meant within the meaning of the invention, a parameter that allows the neighbor that receives it to adapt the characteristics of the flow of messages of the interior gateway protocol sent to the first router and particularly typically the rate or the frequency of sending these messages.

Note that such a flow control parameter can be intended to control the flow of all the messages of the interior gateway protocol sent to the first router or only part of these messages. Thus, for example, in the case of the link state gateway protocols, it can be envisaged that this flow control parameter is intended to control the flow of the messages of synchronization of the topology bases only.

Such a control parameter is for example:

a parameter representative of a maximum rate of sending messages of the interior gateway protocol to the first router; and/or a parameter representative of a size of a memory of the first router intended to temporarily store messages of the interior gateway protocol that are received by the first router; and/or;

a parameter representative of a maximum time of processing, by the first router, all the messages of the interior gateway protocol or a category of messages of the interior gateway protocol that are previously received by the first router and stored in a memory of the first router.

The flow control parameter(s) announced by the first router thus allow(s) its neighbors to modulate the sending of the messages of the interior gateway protocol based on the capacities to process these messages of the first router, that is to say for example on its hardware characteristics (ex. size of its memory, power and number of CPUs it has, etc.), on the way it manages the announcement of the messages, on its loading state, on its message processing speed, etc. Thanks to the knowledge of this/these control parameter (s), each neighbor of the first router is no longer constrained to apply an arbitrary delay time between two messages sent to the first router (for example two messages of synchronization of topology bases in the case of a link state IGP protocol), determined conservatively relative to all the routers belonging to the autonomous system, but has the freedom to apply (based on its own capacities for example, or on its state) a shorter delay time if necessary in order to transmit these messages more quickly to the first router if the capacities of the latter allow it. Although a shorter delay time is applied, it is chosen advantageously in line with the processing capacities of the first router so that it allows avoiding a saturation of the first router.

The performance of the interior gateway protocol can therefore be greatly improved. The invention indeed offers the possibility of a faster communication between the routers of the autonomous system of the messages of the interior gateway protocol and routing information conveyed by them when possible, allowing a reduction of the data packet losses in the autonomous system as well as micro-loops likely to saturate links of the latter (a micro-loop is a temporary but penalizing loop created in the routing of the packets due to a synchronization delay time between two routing tables) This results in better stability of the autonomous system.

It should also be noted that the resources of the autonomous system that are consumed by the invention to set up a faster communication of the routing information between the routers are largely compensated by the saved resources due in particular to the unnecessary routing calculations based on obsolete or partial routing data which are avoided, including in situations of instability of the autonomous system.

Advantageously, the improvement in the speed of the communication of the routing information is achieved with the guarantee of not saturating the routers of the autonomous system: the flow control parameters making it possible to control the rate of sending the messages of the interior gateway protocol to a router are indeed determined and announced by this router which is ultimately in the best position to know its own capacities to receive and process the messages, either generally or at a given time.

The invention also allows, on the one hand, adapting the speed of sending the messages of the interior gateway protocol based on the capacities of each router of the autonomous system and, on the other hand, taking into account an evolution of these capacities over time, for example due to hardware or software evolutions. For this, a concerned router only needs to modify the flow control parameters it announces to its neighbors.

Furthermore, the invention also allows an adaptation of the speed of sending the messages of the interior gateway protocol depending on the role of each router within the autonomous system. Thus, by way of example, the core routers that are considered as having a crucial role in terms of routing generally have greater processing capacities and are subjected to a lower charge of the control plane related to the low number of clients connected thereto. The invention allows more strongly prioritizing the communication of the routing information to this type of routers.

The invention also allows the first router, as more detailed later, to announce different flow control parameters to each of its neighbors (second routers within the meaning of the invention), for example in order to prioritize its message receiving resources to neighbors whose role is more important or whose position in the topology is more central.

The invention thus has a privileged but non-limiting application in the context of link state interior gateway protocols, by offering an improvement in the "flooding" within the autonomous system. However, it can apply to other interior gateway protocols, such as for example to the RIP and RIPnG protocols.

The invention can advantageously apply to any type of routers, and in particular IP/MPLS routers, and to any type of networks, such as telecommunications operator networks, enterprise networks or data centers known to be often based on mesh networks which pose many difficulties in particular for the scaling of the flooding.

As mentioned above, different types of flow control parameters can be determined and announced by the first router to its neighbors. These receiving flow control parameters are relevant for improving the efficiency of the broadcasting of the messages and in particular of the flooding for a link state IGP protocol within the autonomous system because they are determined by the routers themselves that will receive and process the messages of the interior gateway protocol, from their knowledge of their own processing capacities and potentially of their environment.

Thus, for example, in a particular embodiment in which such a control parameter is a parameter representative of a maximum rate of sending messages of the interior gateway protocol to the first router, this parameter is determined by the first router from a number of routers neighbors of the first router in the autonomous system and from a capacity to process the first router of messages of the interior gateway protocol received by the first router and sent by these neighbor routers.

The information used in this embodiment to determine the maximum sending rate is information that can be easily obtained by the first router. The capacity to process messages of the interior gateway protocol is typically information that the first router is already handling in the mechanisms it implements to protect itself from receiving too many messages, particularly during the denial-of-service attacks. This embodiment is therefore particularly simple to implement.

The control parameters announced by the first router can be determined by taking into account other elements. For example, in a particular embodiment, during the determination step, at least one said control parameter is determined further based on at least one element among:
  a capacity to send the messages of the interior gateway protocol, required for the second router given its role in the autonomous system;
  a position of the first router and/or of the second router in a topology of the autonomous system;
  a rate of a packet switching interface of the first router or of a number of packet switching interfaces per processor of the first router;
  a filtering capacity to protect against a denial-of-service attack of the first router.

This embodiment allows further improving the efficiency of the flooding or more generally of the broadcasting of the messages of the interior gateway protocol within the autonomous system. It allows in particular to the first router to also take into account the nature and needs of its neighbor routers during the determination of the control parameters. Thus, the first router can determine control parameters which vary from one neighbor to the other depending on its role for example in the autonomous system and favor faster transmission of the messages coming from some routers rather than others. The invention therefore offers great flexibility in the flow control policy that can be implemented in the autonomous system thanks to the information announced by the routers.

In addition, as mentioned above, the invention allows taking into account a potential evolution of the autonomous system and of the state and/or capacities of its routers (e.g. hardware or software evolution).

The invention also allows the first router to dynamically determine the control parameters it recommends applying to the routing messages intended for it.

Thus, in a particular embodiment, during the determination step, at least one said control parameter can be determined further based on at least one element among:
  a state of stability of the interior gateway protocol and/or of the autonomous system; and/or
  a loading state of the first router; and/or;
  a flow control parameter for messages of the interior gateway protocol announced by at least one router of the autonomous system neighbor of the first router or known to the first router for said at least one router.

By way of illustration, the stability of the autonomous system can be determined by the first router from the number of routing/topology change IGP messages in the autonomous system. If this number is low, the network is in nominal operation and it is desired to quickly react to the topology changes: the first router, given its processing capacities, may wish to quickly receive these messages in this context and therefore provide a flow control parameter to its neighbors allowing them to transmit more or more quickly these messages thereto. On the other hand, if many topology change IGP messages are exchanged, the network is in an unstable situation. It may be desired to favor the stability of the routing rather than its update speed. The first router can in this context announce a flow control parameter which aims to slow down the sending of the messages in its direction so as not to saturate.

The announcement as such of the flow control parameters determined by the first router can be made via different types of messages already provided or not in the interior gateway protocol.

In a particular embodiment during the announcement step, the message of the interior gateway protocol announcing said at least one control parameter is a message of notification of a presence of the first router sent to its neighbor routers in the autonomous system and/or of checking of a state of these neighbor routers.

Such a message is typically a "hello" message commonly used in the interior gateway protocols and sent periodically by each router of the autonomous system to signal its presence to its neighbor routers and check their state. This embodiment allows easily implementing the invention by being based on already conveyed existing messages in the autonomous system. In addition, the fact that these messages are sent periodically allows easy update of the control parameters with the neighbors of the first router. Of course, it is also possible to envisage sending such messages upon detection of a particular event (for example an evolution of the control parameter) in addition to the periodic sending already provided for by the interior gateway protocol.

The control parameters can also be transmitted in other types of messages, such as for example in topology description messages such as the LSP messages for the IS-IS and LSA protocols for the OSPF protocol or messages of synchronization of the topology database such as CSNP (Complete Sequence Number Packet) or PSNP (Partial Sequence Number Packet) messages provided in the IS-IS protocol or a Database Description message provided in the OSPF protocol. It is also possible to envisage, in another embodiment, a dedicated message allowing the first router to announce, to its neighbors, the flow control parameters it has determined.

In a particular embodiment, the different steps of the communication method and/or of the sending method are determined by computer program instructions.

Consequently, the invention also relates to a computer program on an information medium, this program being likely to be implemented in a router or more generally in a computer, this program including instructions adapted to the implementation of the steps of a communication method or of a sending method as described above.

This program can use any programming language, and be in the form of a source code, object code or intermediate code between source code and object code, such as in a partially compiled form, or in any other desirable form.

The invention also relates to an information or recording medium readable by a computer, and including instructions of a computer program as mentioned above.

The information or recording medium can be any entity or device capable of storing the program. For example, the medium can include a storage means, such as a ROM, for example a microelectronic circuit ROM, an optical memory, for example a DVD ROM, an electronic memory, for example a flash memory, or a magnetic recording means, for example a hard disk.

On the other hand, the information or recording medium can be a transmissible medium such as an electrical or optical signal, which can be routed via an electrical or optical cable, by radio or by other means. The program according to the invention can be particularly downloaded over an Internet type network.

Alternatively, the information or recording medium can be an integrated circuit in which the program is incorporated, the circuit being adapted to execute or to be used in the execution of the method in question.

The invention also relates to an autonomous system comprising at least a first router in accordance with the invention (i.e. able to implement the communication method according to the invention) and a second router in accordance with the invention (i.e. able to implement the sending method according to the invention).

The autonomous system according to the invention benefits from the same advantages mentioned above as the first and second routers according to the invention and as the communication and sending methods according to the invention.

In a particular embodiment of the invention, the autonomous system further comprises at least a third router neighbor of the first router, this third router comprising a receiving module, capable of receiving a message of the interior gateway protocol coming from the first router, said message announcing at least one flow control parameter for sending messages of the interior gateway protocol to the first router, said at least one flow control parameter having been determined by the first router based on a capacity of this first router to process said messages of the interior gateway protocol, said third router being configured to ignore said at least one control parameter announced by the first router when sending at least one message of the interior gateway protocol to this first router.

In other words, the third router, although receiving the control parameter(s) announced by the first router, does not apply it when sending the messages of the interior gateway protocol to the first router, and continues using for example the value of the delay time between two messages with which it was hard-configured to send its messages to the first router. In this embodiment, the routers of the autonomous system thus have the freedom to apply or not the flow control parameters announced to them by their neighbors. It is noted that such a configuration of the third router may be static or, on the contrary, may evolve over time, for example depending on a state of the third router, or other factors.

It can also be envisaged, in other embodiments, that the communication method, the sending method, the first router, the second router and the autonomous system according to the invention have in combination all or part of the aforementioned characteristics.

BRIEF DESCRIPTION OF THE DRAWINGS

Other characteristics and advantages of the present invention will emerge from the description given below, with reference to the appended drawings which illustrate an exemplary embodiment thereof without any limitation. In the figures.

DETAILED DESCRIPTION OF THE INVENTION

Figure 1:
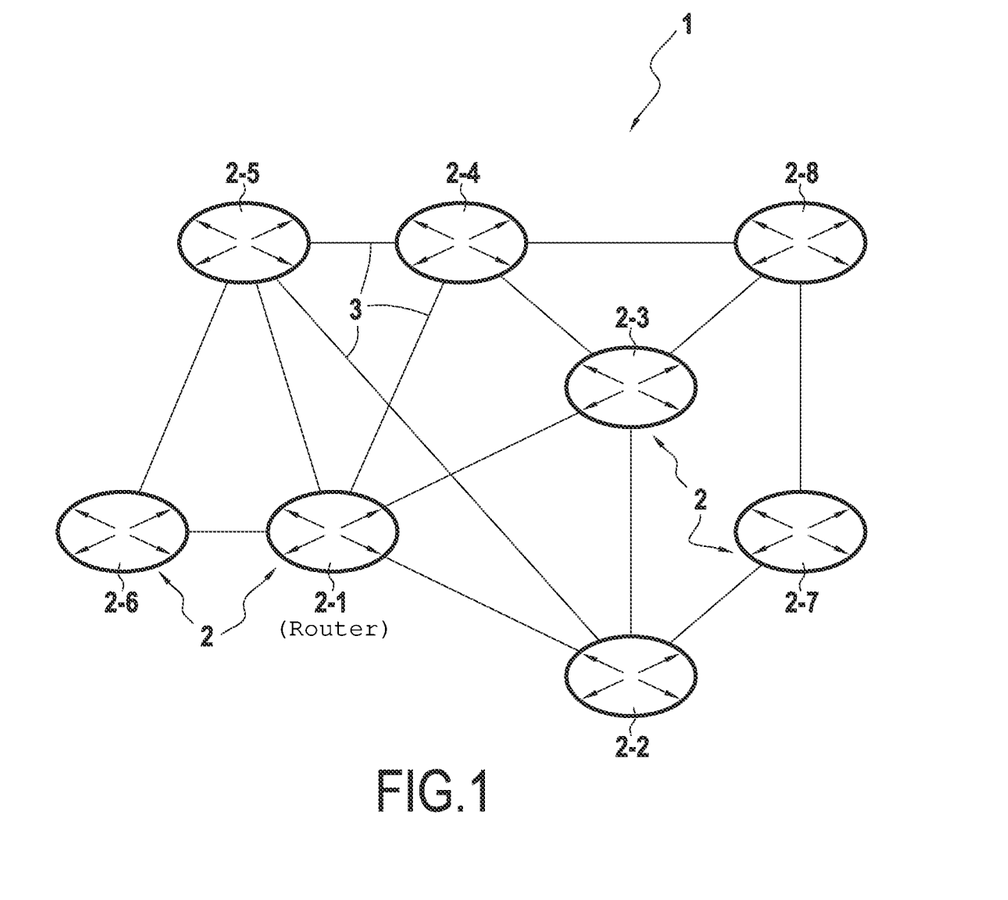
FIG. 1 represents, schematically, an autonomous system and routers in accordance with the invention, in a particular embodiment.

FIG. 1 represents, in its environment, an autonomous system or AS 1, in accordance with the invention, in a particular embodiment.

In this embodiment, the autonomous system 1 is a network comprising a plurality of routers in accordance with the invention, designated by the general reference 2, connected together via links or interconnections 3. The autonomous system 1 implements an Interior or Interior gateway Protocol IGP for routing the data packets exchanged within the IP network(s), such as for example a link state interior gateway protocol such as IS-IS or OSPF. However, this assumption is in no way limiting and the invention can apply to other types of interior gateway protocols, such as, for example, RIP or RIPnG protocols.

In addition, no limitation is attached to the nature of the telecommunication services transported by the networks of the autonomous system 1.

As mentioned above, a link state interior gateway protocol implemented by the autonomous system 1 is a low-level protocol based on the assumption that all the routers 2 have a common topological vision (that is to say a knowledge) of the autonomous system 1, in other words, of the different routers 2 of the autonomous system 1 as well as the interconnections 3 existing between these routers. To this end, each router 2 maintains a topological database TOPO-DB reflecting the topology of the autonomous system 1 and shares it with the other routers 2 of the autonomous system to allow synchronization of the topological databases maintained by all the routers of the autonomous system. It is this topological database that allows each router 2 to determine a route in the autonomous system for the transport of the data packets it receives up to the last routers of the autonomous system towards their recipients.

The synchronization of the topological databases TOPO-DB maintained by the routers 2 of the autonomous system 1 is based in a known manner on the exchange of messages between neighbor routers or throughout the autonomous system (e.g. "hello" messages announcing a presence and/or discovery of the state of its neighbors, database description messages, etc.). This procedure is known per se and is not described in more detail here. The aforementioned messages exchanged between the routers 2 which transport information allowing the routing of the data packets in the autonomous system are "messages of the interior gateway protocol" within the meaning of the invention also designated in the description by IGP messages for the sake of simplification.

In accordance with the invention, the routers 2 of the autonomous system 1 are configured to allow an improvement in the flooding mechanism implemented within the autonomous system 1 compared to the state of the art which consists of hard-configuring at the level of each router 2 of the autonomous system 1, a value here noted d characterizing the delay time to be applied (meet) by the router 2 between two consecutive topology description IGP messages sent to its neighbors (for example d=33 ms or 100 ms).

More particularly to this end, in the embodiment illustrated in FIG. 1, each of the routers 2 is configured to implement both the communication method according to the invention and the sending method according to the invention. In other words:

each of the routers 2 is configured to announce to its neighbors in the autonomous system 1, one or several flow control parameter(s) that it has itself determined to regulate the sending of the messages of the gateway protocol (or a category of messages of the interior gateway protocol, such as the topological database description messages) in its direction; and each of the routers 2 is configured to send messages of the interior gateway protocol to all or part of its neighbors by taking into consideration the control parameter(s) communicated thereto by them. By taking into consideration the control parameters, it is meant here that a router adapts its conditions for sending all or part of the IGP messages to the router having communicated these control parameters thereto: for example if this control parameter is a maximum rate of sending the messages of the interior gateway protocol, the router adapts the frequency of sending these messages to the concerned neighbor router so as not to exceed this maximum rate towards this neighbor router and by trying to become closer to this maximum rate in order to optimize the sending of the messages of the interior gateway protocol. This example is given only by way of illustration, and other examples of control parameters that may be envisaged within the framework of the invention are detailed later.

Thus, in the embodiment illustrated in FIG. 1, each of the routers 2 is a first router and a second router within the meaning of the invention. However, it should be noted that in a particular embodiment, it is possible to envisage that a router 2 is configured to apply the flow control parameters communicated thereto only by some neighbors or types of neighbors (for example by core routers), and to ignore the flow control parameters sent by other neighbors.

Furthermore, the control parameters announced within the framework of the invention can generally concern all the messages of the interior gateway protocol or only a category of messages of the interior gateway protocol (for example the messages of synchronization of the topological databases that are critical for the flooding mechanism). In the embodiment described here, it is considered for the sake of simplicity that the flow control parameters relate to all IGP messages.

In another embodiment, it can be envisaged that some routers of the autonomous system 1, although receiving flow control parameters announced by their neighbors, are configured to completely ignore these flow control parameters, and for example continue to use a fixed and predetermined value hard-configured on these routers as in the state of the art, to send the messages of the interior gateway protocol to their neighbors (third routers within the meaning of the invention). This configuration may be static or may be brought to evolve over time depending on various factors.

Figure 2:
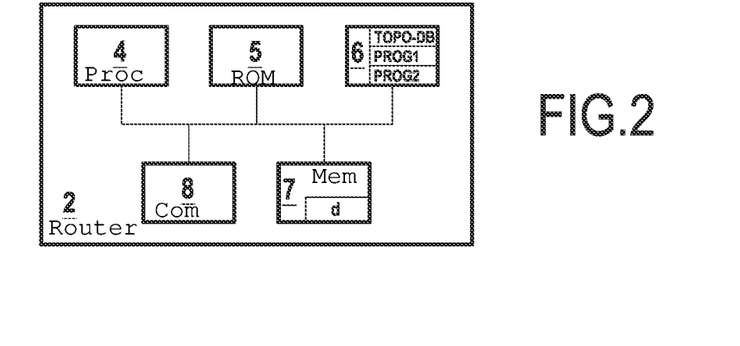
FIG. 2 illustrates the hardware architecture of the routers of FIG. 1 in a particular embodiment.

In the embodiment described here, the routers 2 of the autonomous system have the hardware architecture of a computer, as represented in FIG. 2.

It comprises in particular a processor 4, a read only memory 5, a random access memory 6 (in which the topological database TOPO-DB is for example stored), a non-volatile memory 7 (in which the value d hard-configured at each router 2 is for example stored) as well as communication means 8. These communication means 8 allow the router 2 to communicate with the other routers of the autonomous system AS1, and more particularly with its neighbor routers in the autonomous system. As known, two routers are considered as neighbors when there is an (active) interconnection therebetween and when they regularly exchange messages, for example "hello" for the link state interior gateway protocols. The communication means 8 thus comprise in particular a stack of the IGP protocol implemented in the autonomous system 1 as well as at least one communication interface such as for example a wired or wireless communication interface. No limitation is attached to the nature of this communication interface and in particular to the technology used thereby (ADSL, copper, optical fiber, satellite, WiFI, Bluetooth, 3G, 4G, 5G, etc.).

The random access memory 6 of the router 2 constitutes a recording medium in accordance with the invention, readable by the processor 4 and on which a computer program PROG1 and a computer program PROG2 are recorded in accordance with the invention, including respectively instructions for the execution of a communication method and of a sending method according to the invention.

Figure 3:
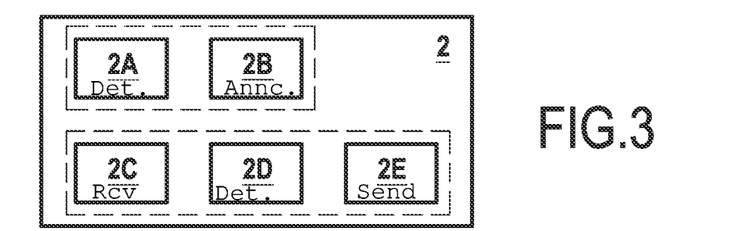
FIG. 3 represents the different functional modules of the routers of FIG. 1.

The program PROG1 defines various functional and software modules here of the router 2, suitable for implementing the steps of the communication method according to the invention and based on the hardware elements 4-8 of the router 2. These functional modules comprise in particular, in the embodiment described here, as illustrated in FIG. 3:
- a first determination module 2A, configured to determine at least one flow control parameter for messages of the interior gateway protocol (IGP messages) that are sent thereto, this flow control parameter being determined based on a capacity of the router 2 to process the messages of the interior gateway protocol; and
- an announcement module 2B, configured to announce this control parameter to at least one neighbor router in the autonomous system 1.

The program PROG2 also defines various functional and software modules here of the router 2, suitable for implementing the steps of the sending method according to the invention and based on the hardware elements 4-8 of the router 2. These functional modules comprise in particular, in the embodiment described here:
- a receiving module 2C, capable of receiving a message of the interior gateway protocol coming from a neighbor router of the autonomous system 1, this message announcing at least one flow control parameter for sending IGP messages to this neighbor router, this flow control parameter having been determined by the neighbor router based on its capacity to process the IGP messages; and
- a second determination module 2D, configured to determine conditions for sending at least one IGP message to this neighbor router that are adapted to the flow control parameter(s) announced by the latter; and
- a sending module 2E, configured to send said at least one IGP message to this neighbor router by applying the sending conditions determined by the second determination module 2D.

The functions of the modules 2A to 2E of each router are now described with reference to the steps of the communication and sending methods according to the invention.

Figure 4:
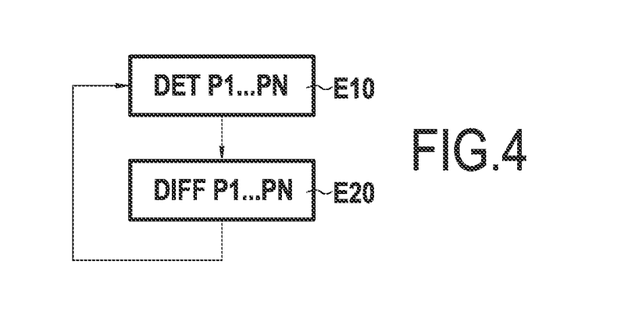
FIG. 4 represents, in the form of a flowchart, the main steps of a communication method according to the invention, as implemented by a router of FIG. 1.

FIG. 4 represents the main steps of a communication method according to the invention as implemented by a router 2 of the autonomous system, in a particular embodiment. To better illustrate the invention, there is here a focus more particularly on the implementation of this method by the router 2-1 represented in FIG. 1.

In accordance with the invention, the router 2-1 is configured to determine, via its first determination module 2A, one or several flow control parameter(s) noted P1, P2, ..., PN (N designating an integer greater than or equal to 1) for sending messages intended thereto of the interior gateway protocol implemented by the autonomous system 1 (step E10). This or these control parameter(s) are intended to allow the routers neighbors of the router 2-1 (namely in the example illustrated in FIG. 1 the routers 2-2, 2-3, 2-4, 2-5 and 2-6) to adapt the conditions for sending IGP messages to the router 2-1, and in particular to send the IGP messages (typically the topological database synchronization messages) at a speed greater than the speed corresponding to the delay time value d hard-parameterized at each router 2, the idea being to accelerate the communication of the IGP messages to the router 2-1 when this is relevant and possible.

According to the invention, the control parameter(s) P1, ..., PN are determined by the router 2-1 via its first determination module 2A based on a capacity of the router 2-1 to process the IGP messages. This capacity can depend on different factors and be estimated by the first determination module 2A in different ways.

Thus, for example, this processing capacity can correspond in particular to the service capacity (CPU capacity) considered by the mechanisms of protection against the denial-of-service attacks conventionally implemented by the routers of an autonomous system (and in particular by the routers 2 of the autonomous system 1). In a known manner, a denial-of-service attack results in a sending of a very large number of announcement messages to one or several router(s) of the autonomous system with the malicious aim of exceeding their capacity to process these messages. This capacity designates the maximum number of messages that can be stored and processed by the CPU of the router 2-1 and beyond which the incoming messages are rejected in order to avoid saturation of the router. It is known to the router since it uses it to implement the aforementioned mechanisms of protection against the denial-of-service attacks (for example it is hard-configured at the non-volatile memory 7 of the router 2-1), and can be easily obtained by the first determination module 2A.

The capacity to process IGP messages of the router 2-1 can also be estimated as a function of other factors such as for example the size of a buffer or of a memory that the router 2-1 dedicates to the processing of the IGP messages, in other words which is intended to store the IGP messages arriving from its neighbor routers before their processing as such with a view to updating its topological database TOPO-DB.

Different flow control parameters P1, ..., PN can be determined from this processing capacity by the router 2-1, such as for example:
- a parameter P1 representative of a maximum rate of sending IGP messages to the router 2-1;
- a parameter P2 representative of a size of a buffer or of a memory of the router 2-1 intended to store the IGP messages received by the router 2-1 and sent by its neighbors;
- a parameter P3 representative of a maximum time of processing by the router 2-1 of the IGP messages received by the router 2-1 and sent by its neighbors, and stored in a buffer or a memory of the router 2-1.

In the embodiment described here, these flow control parameters are determined per neighbor, and the parameters P1 and P2 are expressed respectively in number of messages per second and in number of messages. As a variant, other units can of course be envisaged as well as other flow control parameters.

To determine the parameter P1, the first determination module 2A uses, for example, the previously mentioned service capacity and divides it by its number of neighbors in the autonomous system 1 (5 in the example illustrated in FIG. 1).

To determine the parameter P2, the first determination module 2A similarly divides the size of the buffer or of the memory it dedicates to the storage of the IGP messages by its number of neighbors in the autonomous system 1.

The first determination module 2A can determine for the parameter P3 an upper limit of the maximum processing time that seems necessary to process the IGP messages sent by its neighbors and stored in the buffer or the memory provided for this purpose.

It should be noted that it is not necessary for the router 2-1 to determine all of the flow control parameters mentioned above. It may indeed need to only determine at least one of these flow control parameters, such as the parameter P1 for example.

Moreover, the router 2-1 can take into account other factors in addition to its capacity to process IGP messages to determine the flow control parameter(s) P1 . . . PN, and in particular factors or characteristics specific to its neighbor routers from which it receives the IGP messages. No matter how it obtains these characteristics: they can be known to the router 2-1 because it has been configured therewith, or they can be announced by the neighbor routers in question for example in their capacities or "Router capability" like described in particular in document RFC 7981 edited by the IETF for the IS-IS protocol or in the document RFC 7770 for the OSPF protocol, or in yet another variant, it can deduce these characteristics from standard topology information announced by the interior gateway protocol (e.g. role or position of the neighbor router in the autonomous system 1, number of neighbors for each router or rates on each of its interfaces).

Thus, more specifically, the router 2-1 can for example take into account at least another element among:
- a capacity to send the IGP messages required for its neighbor routers given their roles in the autonomous system 1: for the router 2-1 here it is about taking into account the needs (in particular in terms of rate, rhythm or volume) of its neighbor routers in terms of announcement of the IGP messages to possibly allocate more resources for processing these IGP messages to the neighbor routers that need them or use them the most and on the contrary to avoid allocating too much resources to the neighbor routers that do not need them or that are unable to benefit from them;
- its position and/or the position of its neighbor routers in the topology of the autonomous system 1 (e.g. it concerns core routers, having a significant role in the routing and for which it is about making the routing more efficient, or access routers of the autonomous system 1, more oriented towards processing dedicated to the clients);
- a rate of an interface of one of its routing switching processor(s) or the number of interfaces available per routing switching processor; and/or its message filtering capacity to protect itself from denials of service (mechanism present on all the routers).

As mentioned previously, the router 2-1 determines in the embodiment described here, flow control parameters per neighbor. These flow control parameters can differ from one neighbor router to another (in particular if characteristics of the neighbor routers are taken into account), or alternatively be identical for all neighbor routers of the router 2-1.

It should also be noted that the flow control parameters may have to evolve over time. This evolution may be slow (for example related to a one-time change in the topology of the autonomous system 1 and of the neighborhood of the router 2-1), or be more dynamic and result in particular from taking into account factors likely to vary more quickly over time. This is the case, for example, when the router 2-1 takes into account at least one element among the following elements to determine the flow control parameters P1, . . . , PN:
- a state of stability of the interior gateway protocol and/or of the autonomous system 1;
- its loading state;
- a flow control parameter for the IGP messages announced by one of its neighbors or known to this neighbor.

These examples are given only by way of illustration and still other factors may be considered by the router 2-1 in addition to its capacity to process IGP messages in order to determine the flow control parameter(s) P1, . . . , PN.

Furthermore, it should also be noted that in the case where the flow control parameters P1, . . . , PN concern only one category of IGP messages, they can be determined either by taking into account the capacities of the first router and/or of its neighbor routers (receiving and processing capacities, sending capacities, processing time, etc.) with regard to this category of IGP messages specifically or with regard to all the IGP messages exchanged under the interior gateway protocol.

Once the flow control parameters P1, . . . , PN determined by the first module of determination 2A of the router 2-1, the latter announces these control parameters to its neighbors via its announcement module 2B (step E20). In the remainder of the description, the IGP announcement message will designate the message used by the router 2-1 to announce the control parameters it has determined to its neighbor routers.

In the embodiment described here, the announcement module 2B announces the control parameters P1, . . . PN in "hello" messages of notification of its presence and/or of checking of the state of its neighbors, in a field provided for that purpose. Such "hello" messages are conventionally used in the link state IGP protocols such as the IS-IS and OSPF protocols: this embodiment is therefore advantageously based on messages already defined for these protocols, which are slightly modified so as to include a new field allowing the transport of the flow control parameters P1, . . . , PN.

It is noted that in a known manner, the "hello" messages are sent periodically by the routers of an autonomous system to their neighbors. This embodiment therefore also allows signaling at a lower cost an evolution in the flow control parameters determined by the router 2-1.

As a variant, other messages can be used by the router 2-1 to announce the flow control parameters P1, . . . , PN it has determined, such as for example an IGP message provided specifically for that purpose, or a message of synchronization or description of the topology databases (e.g. CSNP/PSNP messages or LSP messages broadcast in the known IGP protocols).

It should be noted that when the router 2-1 determines flow control parameters specific to each of its neighbor routers, it preferably announces in the IGP message of announcement of the flow control parameters intended for this neighbor router, only the parameters that concern it.

Figure 5:
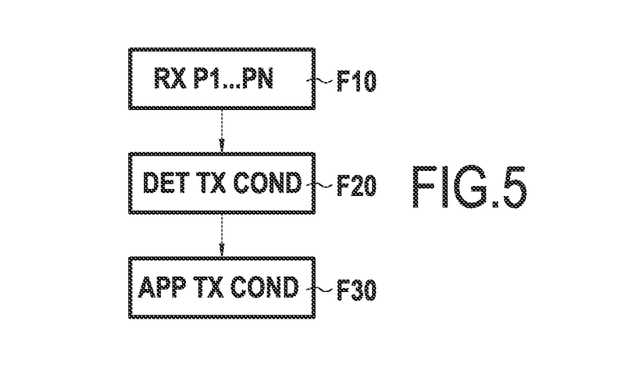
FIG. 5 represents, in the form of a flowchart, the main steps of a sending method according to the invention, as implemented by a router of FIG. 1.

FIG. 5 illustrates the main steps of a sending method according to the implemented invention, in a particular embodiment, by the neighbor routers of the router 2-1 when they receive the message of announcement of the flow control parameters of the router 2-1. In the example considered in FIG. 1, each of the neighbor routers of the router 2-1, in other words the routers 2-2, 2-3, 2-4, 2-5, and 2-6, implements this method. FIG. 5 is described with reference to the router 2-2 for illustrative purposes only.

Upon receipt by the receiving module 2C of the router 2-2 of the announcement message sent by the router 2-1 containing the flow control parameters P1, ..., PN (step F10), router 2-2 extracts these parameters and transmits them to its second determination module 2D. The second determination module 2D determines conditions for sending IGP messages intended for the router 2-1 that are adapted to these flow control parameters (step F20). By adapted to these flow control parameters, it is meant that the conditions for sending IGP messages thus determined fall (as far as possible and within the capacities of the router 2-2) within the flow control parameters transmitted by the router 2-1: in other words, the second determination module 2D adapts the conditions for sending the IGP messages to the router 2-1 so that they do not exceed, and if possible become closer to, the flow control parameters transmitted by the router 2-1. Thus, if the flow control parameters transmitted comprise a maximum rate of sending the IGP messages, the second determination module 2D checks whether this maximum sending rate can be applied and/or reached by the sending module 2E of the router 2-2 to send the IGP messages to the router 2-1 and, if applicable, retains as a condition for sending the IGP messages to the router 2-1 this maximum rate (as replacement for the hard-preconfigured value d normally separating the sending of two IGP messages), so as to accelerate the transmission of the IGP messages towards the router 2-1.

The sending conditions thus determined by the second determination module 2D are then transmitted to the sending module 2E of the router 2-2, which then sends the IGP messages intended for the router 2-1 while complying with the conditions thus determined (step F30).

It should be noted that it is not always possible for the router 2-2 to adapt the conditions for sending the IGP messages to the router 2-1 in accordance with the flow control parameters it has received therefrom. In this case, the second determination module 2D is configured to adapt the conditions for sending the IGP messages so as to become as close as possible to the received flow control parameters given the current capacities of the router 2-2. The router 2-2 applies these sending conditions as long as it has not received new values for the flow control parameters of the router 2-1 and as long as its condition allows it.

In another embodiment, the router 2-2 can take into account the control parameters announced by the router 2-1 only for a category of IGP messages, such as for example for the topological database synchronization messages.

In addition, and as mentioned previously, it is possible to envisage having, within the autonomous system 1, routers that ignore the flow control parameters emitted by their neighbor routers and continue to apply the value d with which they were hard-configured that designates the delay time to meet for the successive sending of two IGP messages.

In another embodiment, the routers can be configured to apply the received control parameters to some of their neighbors and not to apply them for other neighbors, depending for example on the position of these neighbors in the topology of the autonomous system or on their role in the autonomous system. It is thus left a great freedom to each router to apply or not the flow control parameters recommended by their neighbors.

Although the present disclosure has been described with reference to one or more examples, workers skilled in the art will recognize that changes may be made in form and detail without departing from the scope of the disclosure and/or the appended claims.

The invention claimed is:

1. A communication method implemented by a first router of an autonomous system using an interior gateway protocol, said communication method comprising:

determining at least one flow control parameter for sending messages of the interior gateway protocol to the first router, said at least one flow control parameter being determined based on a capacity of the first router to process said messages of the interior gateway protocol; and announcing, in a message of the interior gateway protocol, said at least one flow control parameter to at least a second router of the autonomous system, which is a neighbor of the first router, wherein during the determining, at least one of said at least one flow control parameter is determined further based on at least one element among:

a position of the second router in a topology of the autonomous system;

a capacity to send messages of the interior gateway protocol, required for the second router given its role in the autonomous system;

a filtering capacity to protect against a denial-of-service attack of the first router;

a flow control parameter for messages of the interior gateway protocol announced by at least one router of the autonomous system which is a neighbor of the first router or known to the first router for said at least one router; or a state of stability of the interior gateway protocol ("IGP") and/or of the autonomous system, wherein the state of stability of the autonomous system is determined by the first router from the number of routing or topology change IGP messages in the autonomous system, wherein when one of said at least one flow control parameter is determined further based on the position of the second router in the topology of the autonomous system, the determining of the flow control parameter comprises:

prioritizing resources for receiving IGP messages from the second router when the second router holds a central position in the topology, is a core router, or is an access router of the autonomous system that is oriented towards processing dedicated to clients; and when one of said at least one flow control parameter is determined further based on the capacity to send messages of the interior gateway protocol, required for the second router given its role in the autonomous system, the determining of the flow control parameter comprises:

allocating more IGP message processing resources to the second router when the second router has a greater need in terms of rate, rhythm or volume to announce the IGP messages to the first router, and allocating fewer IGP message processing resources to the second router when the second router has a lesser need to announce the IGP messages to the first router.

2. The communication method according to claim 1, wherein said at least one flow control parameter comprises:
  a parameter representative of a maximum rate of sending messages of the interior gateway protocol to the first router; and/or
  a parameter representative of a size of a memory of the first router to temporarily store messages of the interior gateway protocol that are received by the first router; and/or
  a parameter representative of a maximum time of processing, by the first router, all the messages of the interior gateway protocol or a category of messages of the interior gateway protocol that are previously received by the first router and stored in a memory of the first router.

3. The communication method according to claim 2, wherein said parameter representative of a maximum sending rate is determined from a number of routers which are neighbors of the first router in the autonomous system and from a capacity to process of the first router of the messages of the interior gateway protocol received by the first router and sent by these neighbor routers.

4. The communication method according to claim 1, wherein during the determining, at least one of said at least one flow control parameter is determined further based on:
  a position of the first router in the topology of the autonomous system; and/or a rate of a packet switching interface of the first router or of a number of packet switching interfaces per processor of the first router.

5. The communication method according to claim 1, wherein during the determining, at least one of said at least one flow control parameter is determined further based on: a loading state of the first router.

6. The communication method according to claim 1, wherein during the announcing, the message of the interior gateway protocol announcing said at least one flow control parameter is a message of notification of a presence of the first router sent to its neighbor routers in the autonomous system and/or of checking of a state of these neighbor routers.

7. The communication method according to claim 1, wherein the interior gateway protocol is a link state interior gateway protocol.

8. The communication method according to claim 7, wherein said at least one flow control parameter for sending messages of the interior gateway protocol to the first router is a flow control parameter for sending topological database synchronization messages.

9. A method for sending messages of an interior gateway protocol implemented in an autonomous system, said method being implemented by a second router of the autonomous system and comprising:
  receiving a message of the interior gateway protocol coming from a first router of the autonomous system, which is a neighbor of the second router, said message announcing at least one flow control parameter for messages of the interior gateway protocol, said at least one flow control parameter being based on a capacity of this first router to process said messages of the interior gateway protocol;
  determining conditions for sending at least one message of the interior gateway protocol to the first router that are adapted to said at least one flow control parameter announced by the first router; and
  sending said at least one message of the interior gateway protocol to said first router by applying the determined sending conditions, wherein at least one of said at least one flow control parameter is further based on at least one element among:
  a position of the second router in a topology of the autonomous system;
  a capacity to send messages of the interior gateway protocol, required for the second router given its role in the autonomous system;
  a filtering capacity to protect against a denial-of-service attack of the first router;
  a flow control parameter for messages of the interior gateway protocol announced by at least one router of the autonomous system which is a neighbor of the first router or known to the first router for said at least one router; or
  a state of stability of the interior gateway protocol ("IGP") and/or of the autonomous system, wherein the state of stability of the autonomous system is based on the number of routing or topology change IGP messages in the autonomous system,
  wherein when one of said at least one flow control parameter is further based on the position of the second router in the topology of the autonomous system, the flow control parameter is based on the first router prioritizing resources for receiving IGP messages from the second router when the second router holds a central position in the topology, is a core router, or is an access router of the autonomous system that is oriented towards processing dedicated to clients; and
  when one of said at least one flow control parameter is determined further based on the capacity to send messages of the interior gateway protocol, required for the second router given its role in the autonomous system, the flow control parameter reflects the first router's allocation of more IGP message processing resources to the second router when the second router has a greater need in terms of rate, rhythm or volume to announce the IGP messages to the first router, and reflects the first router's allocation of fewer IGP message processing resources to the second router when the second router has a lesser need to announce the IGP messages to the first router.

10. A non-transitory computer-readable recording medium on which a computer program is recorded which, when executed by a processor of a first router of an autonomous system using an interior gateway protocol, configures the first router to:
  determine at least one flow control parameter for sending messages of the interior gateway protocol to the first router, said at least one flow control parameter being determined based on a capacity of the first router to process said messages of the interior gateway protocol; and announce, in a message of the interior gateway protocol, said at least one flow control parameter to at least a second router of the autonomous system, which is a neighbor of the first router, wherein during the determining, at least one of said at least one flow control parameter is determined further based on at least one element among:
  a position of the second router in a topology of the autonomous system;
  a capacity to send messages of the interior gateway protocol, required for the second router given its role in the autonomous system;

a filtering capacity to protect against a denial-of-service attack of the first router;

a flow control parameter for messages of the interior gateway protocol announced by at least one router of the autonomous system which is a neighbor of the first router or known to the first router for said at least one router;

a state of stability of the interior gateway protocol ("IGP") and/or of the autonomous system, wherein when executed by the processor, the computer program further configures the first router to determine the state of stability of the autonomous system from the number of routing or topology change IGP messages in the autonomous system, wherein when one of said at least one flow control parameter is determined further based on the position of the second router in the topology of the autonomous system, the computer program, when executed by the processor, further configures the first router to:

prioritize resources for receiving IGP messages from the second router when the second router holds a central position in the topology, is a core router, or is an access router of the autonomous system that is oriented towards processing dedicated to clients; and when one of said at least one flow control parameter is determined further based on the capacity to send messages of the interior gateway protocol, required for the second router given its role in the autonomous system, the computer program, when executed by the processor, further configures the first router to:

allocate more IGP message processing resources to the second router when the second router has a greater need in terms of rate, rhythm or volume to announce the IGP messages to the first router, and allocate fewer IGP message processing resources to the second router when the second router has a lesser need to announce the IGP messages to the first router.

11. A first router of an autonomous system, the autonomous system using an interior gateway protocol and the first router comprising:

a processor; and a non-transitory computer-readable medium comprising instructions stored thereon which when executed by the processor configure the first router to:

determine at least one flow control parameter for sending messages of the interior gateway protocol to the first router, said at least one flow control parameter being determined based on a capacity of the first router to process said messages of the interior gateway protocol; and announce said at least one flow control parameter to at least a second router of the autonomous system, which is a neighbor of the first router, wherein during the determining, at least one of said at least one flow control parameter is determined further based on at least one element among:

a position of the second router in a topology of the autonomous system;

a capacity to send messages of the interior gateway protocol, required for the second router given its role in the autonomous system;

a filtering capacity to protect against a denial-of-service attack of the first router;

a flow control parameter for messages of the interior gateway protocol announced by at least one router of the autonomous system which is a neighbor of the first router or known to the first router for said at least one router; or a state of stability of the interior gateway protocol ("IGP") and/or of the autonomous system, wherein when executed by the processor, the instructions further configure the first router to determine the state of stability of the autonomous system from the number of routing or topology change IGP messages in the autonomous system, wherein when one of said at least one flow control parameter is determined further based on the position of the second router in the topology of the autonomous system, the instructions, when executed by the processor, further configure the first router to:

prioritize resources for receiving IGP messages from the second router when the second router holds a central position in the topology, is a core router, or is an access router of the autonomous system that is oriented towards processing dedicated to clients; and when one of said at least one flow control parameter is determined further based on the capacity to send messages of the interior gateway protocol, required for the second router given its role in the autonomous system, the instructions, when executed by the processor, further configure the first router to:

allocate more IGP message processing resources to the second router when the second router has a greater need in terms of rate, rhythm or volume to announce the IGP messages to the first router, and allocate fewer IGP message processing resources to the second router when the second router has a lesser need to announce the IGP messages to the first router.

12. A second router of an autonomous system, the autonomous system using an interior gateway protocol and the second router comprising:

a processor; and a non-transitory computer-readable medium comprising instructions stored thereon which when executed by the processor configure the second router to: receive a message of the interior gateway protocol coming from a first router of the autonomous system, which is a neighbor of the second router, said message announcing at least one flow control parameter for sending messages of the interior gateway protocol to the first router, said at least one flow control parameter being based on a capacity of this first router to process said messages of the interior gateway protocol; determine conditions for sending at least one message of the interior gateway protocol to the first router that are adapted to said at least one flow control parameter announced by the first router; and send said at least one message of the interior gateway protocol to said first router by applying said sending conditions, wherein at least one of said at least one flow control parameter is further based on at least one element among:

a position of the second router in a topology of the autonomous system;

a capacity to send messages of the interior gateway protocol, required for the second router given its role in the autonomous system;

a filtering capacity to protect against a denial-of-service attack of the first router;

a flow control parameter for messages of the interior gateway protocol announced by at least one router of the autonomous system which is a neighbor of the first router or known to the first router for said at least one router; or a state of stability of the interior gateway protocol ("IGP") and/or of the autonomous system, wherein the state of stability of the autonomous system is based on the number of routing or topology change IG P messages in the autonomous system, wherein when one of said at least one flow control parameter is further based on the position of the second router in the topology of the autonomous system, the flow control parameter is based on the first router prioritizing resources for receiving IGP messages from the second router when the second router holds a central position in the topology, is a core router, or is an access router of the autonomous system that is oriented towards processing dedicated to clients; and when one of said at least one flow control parameter is determined further based on the capacity to send messages of the interior gateway protocol, required for the second router given its role in the autonomous system, the flow control parameter reflects the first router's allocation of more IGP message processing resources to the second router when the second router has a greater need in terms of rate, rhythm or volume to announce the IGP messages to the first router, and reflects the first router's allocation of fewer IGP message processing resources to the second router when the second router has a lesser need to announce the IGP messages to the first router.

* * * * *